US012385310B2

(12) United States Patent
Capur

(10) Patent No.: US 12,385,310 B2
(45) Date of Patent: Aug. 12, 2025

(54) FURNITURE HINGE AND PIECE OF FURNITURE WITH SUCH A FURNITURE HINGE

(71) Applicant: Samet Kalip Ve Madeni Esya San. Ve Tic. A.S., Istanbul (TR)

(72) Inventor: Ertac Capur, Istanbul (TR)

(73) Assignee: Samet Kalip Ve Madeni Esya San Ve Tic. A.S., Istanbul (TR)

( * ) Notice: Subject to any disclaimer, the term of this patent is extended or adjusted under 35 U.S.C. 154(b) by 56 days.

(21) Appl. No.: 18/272,478

(22) PCT Filed: Jan. 25, 2021

(86) PCT No.: PCT/TR2021/050058
§ 371 (c)(1),
(2) Date: Jul. 14, 2023

(87) PCT Pub. No.: WO2022/159048
PCT Pub. Date: Jul. 28, 2022

(65) Prior Publication Data

US 2024/0068291 A1 Feb. 29, 2024

(51) Int. Cl.
*E05F 1/08* (2006.01)
*E05F 5/00* (2017.01)

(52) U.S. Cl.
CPC ........... *E05F 5/006* (2013.01); *E05Y 2900/20* (2013.01)

(58) Field of Classification Search
CPC ........... E05Y 2900/20; E05Y 2900/202; E05Y 2900/204; E05Y 2900/208; E05Y 2201/20;

(Continued)

(56) References Cited

U.S. PATENT DOCUMENTS 7,096,535 B2 * 8/2006 Lin ........................ E05F 1/1215 16/50
8,601,644 B1 * 12/2013 Chen ........................ E05F 5/02 16/286

(Continued)

FOREIGN PATENT DOCUMENTS

CN 200952306 Y * 9/2007
CN 200968125 Y * 10/2007

(Continued)

OTHER PUBLICATIONS

International Search Report for corresponding patent application No. PCT/TR2021/050058, dated Oct. 11, 2021, 9 pages (not prior art).

(Continued)

*Primary Examiner* — Chuck Y Mah
(74) *Attorney, Agent, or Firm* — Lucian Wayne Beavers; Patterson Intellectual Property Law, PC

(57) ABSTRACT

A furniture hinge includes a first hinge part for attachment to a furniture door or flap, and a second hinge part for attachment to a furniture body. A hinge assembly movably connects the first hinge part to the second hinge part. A damping element dampens an opening movement and/or a closing movement of the hinge assembly at least towards the end of the movement. The damping element includes a cylinder, a piston linearly movable in the cylinder, and a piston rod coupled to the piston and projecting from the cylinder. The cylinder of the damping element is fastened pivotably about a pivot axis directly or indirectly to one of the hinge parts at least during the opening movement and/or closing movement of the furniture hinge.

16 Claims, 7 Drawing Sheets

(58) Field of Classification Search
CPC ........... E05Y 2201/21; E05Y 2201/261; E05F 5/006; E05F 5/02; E05F 5/027; E05D 11/1021; E05D 11/1042; E05D 11/105; E05D 11/1064; E05D 7/04; E05D 7/0407; E05D 7/125; E05D 3/142; E05D 16/286; E05D 16/258
See application file for complete search history.

(56) References Cited

U.S. PATENT DOCUMENTS

| | | | | |
|---|---|---|---|---|
| 2005/0248246 | A1* | 11/2005 | Ger | E05F 5/006<br>312/334.47 |
| 2011/0072617 | A1* | 3/2011 | Lin | E05F 5/006<br>16/298 |
| 2017/0096849 | A1* | 4/2017 | Kruedener | E05F 5/10 |
| 2017/0138106 | A1* | 5/2017 | Stuke | E05F 1/14 |
| 2017/0152693 | A1* | 6/2017 | Chen | E05F 5/02 |
| 2017/0218675 | A1* | 8/2017 | Cooper | E05D 7/0415 |
| 2020/0149335 | A1* | 5/2020 | Stuke | E05D 3/142 |
| 2021/0148151 | A1* | 5/2021 | Weber | E05F 5/02 |

FOREIGN PATENT DOCUMENTS

| | | | | | |
|---|---|---|---|---|---|
| CN | 203856316 | U | * | 10/2014 | |
| DE | 10159140 | A1 | | 7/2002 | |
| DE | 202006001648 | U1 | | 5/2006 | |
| DE | 202006013357 | U1 | * | 2/2008 | E05D 3/142 |
| DE | 102007031175 | B3 | | 10/2008 | |
| EP | 1555372 | A1 | | 7/2005 | |
| EP | 2057338 | A1 | | 5/2009 | |
| EP | 2140091 | A1 | | 1/2010 | |
| RU | 2429333 | C2 | | 9/2011 | |
| TW | M400505 | U | * | 3/2011 | |
| WO | 2008025591 | A1 | | 3/2008 | |
| WO | 2008077520 | A1 | | 7/2008 | |
| WO | WO-2009021799 | A1 | * | 2/2009 | E05F 5/006 |
| WO | 2010102445 | A1 | | 9/2010 | |
| WO | WO-2012064297 | A1 | * | 5/2012 | E05F 3/20 |
| WO | 2020242394 | A1 | | 12/2020 | |

OTHER PUBLICATIONS

English translation of corresponding Russian office action (2 pages)(not prior art).

* cited by examiner

FURNITURE HINGE AND PIECE OF FURNITURE WITH SUCH A FURNITURE HINGE

BACKGROUND OF THE DISCLOSURE

Field of the Disclosure

The present invention refers to a furniture hinge for fastening a furniture door or flap of a piece of furniture to a furniture body of the piece of furniture in an articulated manner. The furniture hinge comprises:

- a first hinge part for attachment to the furniture door or flap, and
- a second hinge part for attachment to the furniture body,
- a hinge assembly which movably connects the first hinge part to the second hinge part in order to realise an opening movement of the furniture hinge, in which the first hinge part moves away from the second hinge part, and an oppositely directed closing movement of the furniture hinge,
- at least one damping element for damping the opening movement and/or the closing movement of the furniture hinge at least towards the end of the movement, the damping element comprising a cylinder, a piston which is linearly movable therein relative to the cylinder, and a piston rod which is coupled to the piston and projects from the cylinder, and
- a mounting piece which is attached to the furniture body and to which the second hinge part is attached Furthermore, the invention refers to a piece of furniture comprising a furniture body and a furniture door or flap fastened to the furniture body in an articulated manner by means of at least one furniture hinge.

Description of the Prior Art

Such furniture hinges and pieces of furniture with such furniture hinges are known in various embodiments from the prior art. In this context, reference is made by way of example to DE 101 59 140 A1, DE 20 2006 001 648 U1, EP 1 555 372 A1 and DE 10 2007 031 175 B3. Usually, the damping element is rigidly attached to or in the second hinge part. Actuation of the damping element is effected via the piston rod through the first hinge part, which is movable relative to the second hinge part, or through another component of the furniture hinge attached to the first hinge part. These known furniture hinges have the disadvantage that, during the opening movement and/or closing movement of the furniture hinge, transverse forces, i.e. forces directed transverse to the direction of movement of the piston rod in the cylinder of the damping element, are exerted on the piston rod. These transverse forces can weaken the damping element over time, for example by impairing the tightness of the piston in the cylinder or a bearing of the piston in the cylinder. The result can be leakage and/or a defect of the entire damping element. To overcome this disadvantage, it is known to provide deflection gears between the first hinge part or the other component of the furniture hinge attached thereto on the one hand and the piston rod of the damping element on the other hand, which are intended to transform the non-linear movement of the first hinge part or the other component of the furniture hinge attached thereto into a actuating movement that is as straight as possible and which acts in the direction of movement of the piston rod. However, it is disadvantageous that the deflection gears require additional components, which increases material and assembly costs. In addition, the deflection gears are mechanically susceptible and require a relatively large installation space.

Another furniture hinge is known from WO 2010/102 445 A1 in which the damping element is attached to the mounting piece so that it can pivot about a pivot axis in respect to the mounting piece. However, this requires a relatively large installation space and only properly works in the proposed manner only if the mounting piece is angled. For an adjustment of the furniture hinge or of the furniture door or flap in respect to the furniture body, the relative position of the second hinge part in respect to the mounting piece can be adjusted. In the case of the hinge described in this document, an adjustment of the relative position results in a variation of the position of an articulation point on the piston rod of the damping element, while the pivot axis through which the cylinder of the damping element is pivotably fastened to the mounting piece remains unchanged. This results in an undesired variation of the damping properties or damping characteristics of the damping element.

Based on the described prior art, it is an object of the present invention to provide for a compact, inexpensive and durable furniture hinge with damping properties.

SUMMARY OF THE DISCLOSURE

To solve this problem, a furniture hinge and a piece of furniture are proposed. In particular, starting from the furniture hinge of the type mentioned at the beginning, it is suggested that the cylinder of the damping element is fastened to one of the hinge parts or to a first component of the furniture hinge, which is rigidly connected to one of the hinge parts at least during the opening movement and/or closing movement of the furniture hinge, pivotably about a pivot axis.

The first hinge part is, for example, a hinge cup, and the second hinge part is, for example, a hinge arm. The hinge cup is preferably placed in a recess on the inside of the furniture door or flap in a known manner and fastened thereto, for example by means of screws. The hinge arm is preferably attached to the mounting piece, which in turn is attached to the furniture body on the inside of the piece of furniture, e.g. by means of screws. The hinge arm can be attached to the mounting piece, e.g. by means of screws, a snap-in connection or the like. The attachment of the hinge arm to the mounting piece can be fixed, adjustable and/or releasable. For example, it is conceivable to fix the hinge arm, and with it those components of the furniture hinge attached to it and the furniture door or flap, in a desired position and/or orientation with respect to the mounting piece by means of screws. It would also be conceivable to use one or more screws to adjust a distance of the whole or a part of the hinge arm in respect to the mounting piece. Adjustment of the position and/or orientation of the hinge arm in respect to the mounting piece serves to adjust the furniture hinge or the furniture door or flap in respect to the furniture body or an adjacent furniture door or flap of the piece of furniture.

The hinge assembly may comprise one or more hinge levers attached to the hinge cup on one side and to the hinge arm on the other side in an articulated manner. Several hinge levers preferably extend parallel or slightly oblique to each other. The hinge levers may have a flat extension or, in a longitudinal section, a straight extension, or, in a longitudinal section, they may have a curved or bent extension. The hinge assembly connects the components of the furniture hinge associated with the hinge cup to the components of the furniture hinge associated with the hinge arm.

According to the invention, the cylinder of the damping element may be pivotally attached to a component of the furniture hinge which is arranged on a side of the hinge assembly facing the hinge arm, i.e. is associated with the hinge arm, or is arranged on a side of the hinge assembly facing the hinge cup, i.e. is associated with the hinge cup. Another component of the furniture hinge, which is arranged on the respective other side of the hinge assembly, or a component of the hinge assembly itself, can act on the piston rod and provide for actuation of the damping element.

A pivotable attachment of the cylinder of the damping element to a component of the furniture hinge other than the mounting piece has several advantages. On the one hand, the cylinder can change its position relative to the component to which it is pivotally attached during an opening movement and/or closing movement of the furniture hinge. The change in position of the cylinder can be defined, for example, by the movement of another component of the furniture hinge which is attached to the piston rod of the damping element for actuating the damping element. This ensures that a majority of the forces acting on the piston rod of the damping element during the opening movement and/or closing movement of the furniture hinge are always directed parallel to the direction of movement of the piston in the cylinder of the damping element. Transverse forces acting on the piston rod of the damping element during the opening movement and/or closing movement are significantly reduced, if not completely eliminated. As a result, the mechanical stress on the damping element, in particular on a seal of the piston, on the piston itself and/or on a bearing of the piston or the piston rod in the cylinder, is significantly reduced, which results in a longer service life of the damping element.

Furthermore, in the case of furniture hinges in which the hinge arm is adjustably fastened to the mounting piece, the invention has the advantage that an adjustment of the position and/or orientation of the hinge arm in respect to the mounting piece does not result in a variation of an articulation point on the piston rod of the damping element in respect to the pivot axis via which the cylinder of the damping element is pivotably fastened to the one hinge part or the first component of the furniture hinge. In this way, an undesired variation of the damping properties or damping characteristics of the damping element can be avoided.

According to an advantageous further development of the present invention, it is suggested that the cylinder of the damping element is fastened to the one hinge part or to the first component of the furniture hinge rigidly connected to the one hinge part pivotably about the pivot axis in such a manner that a pivot position of the cylinder of the damping element in respect to the one hinge part or to the first component of the furniture hinge rigidly connected to the one hinge part changes during the opening movement and/or closing movement of the furniture hinge. During the entire opening movement and/or closing movement between a fully closed position of the furniture hinge and a fully open position of the furniture hinge, the pivot position of the cylinder preferably changes continuously. However, it is also conceivable that the cylinder is pivotably fastened to the one hinge part or to the first component in such a way that during the entire opening movement and/or closing movement, starting from an initial position of the furniture hinge, the pivot positon of the cylinder increases and reaches a maximum value after part of the opening movement and/or closing movement, and that the pivot position then decreases again in the further course of the opening movement and/or closing movement until the furniture hinge reaches an end position.

According to a preferred embodiment of the present invention, it is suggested that that hinge part to which the cylinder of the damping element is not fastened, or a second component of the furniture hinge connected to that hinge part, is connected to the piston rod of the damping element at least towards the end of the opening movement and/or the closing movement and actuates the damping element. The second component connected to that hinge part may be rigidly attached to that hinge part or movably connected thereto. Thus, it would be conceivable that the second component is formed by a component of the hinge assembly, for example a hinge lever. In this respect, it is advantageous that the furniture hinge does not require any additional components that form a deflection gear for straight-line actuation of the damping element. Instead, one of the components that is already present in a furniture hinge (e.g. the hinge cup or a hinge lever of the hinge assembly) acts directly on the piston rod and realises a direct actuation of the damping element.

The component of the furniture hinge that actuates the damping element must move in respect to the component of the furniture hinge to which the cylinder of the damping element is pivotally attached during at least part of the opening movement and/or the closing movement of the furniture hinge. The component of the furniture hinge which actuates the damping element can actuate the piston rod of the damping element simply by abutment or contact. Preferably, however, it is suggested that the component of the furniture hinge which actuates the damping element is hinged to the piston rod, i.e. pivotably attached, so that the actuating component is in operative connection with the piston rod at all times during the opening movement and/or the closing movement of the furniture hinge. This has the further advantage that the damping element can be actuated both by pulling and by pushing on the piston rod. This enables damping of the furniture hinge both during the opening movement and during the closing movement.

Advantageously, it is suggested that the hinge assembly comprises at least one hinge lever which is connected to the first hinge part pivotable about a first hinge axis and connected to the second hinge part pivotable about a second hinge axis, wherein the hinge lever forms the second component of the furniture hinge which is connected to the piston rod of the damping element at least towards the end of the opening movement and/or the closing movement and actuates the damping element. The hinge lever is mounted on the one hand on the first hinge axis of the hinge cup and on the other hand on the second hinge axis of the hinge arm. The hinge lever can have a flat or, in a longitudinal section, straight extension. Preferably, however, the hinge lever is curved or angled. The hinge lever may even be designed as an angled lever, wherein preferably the first hinge axis extends at one end of a first lever arm and the second hinge axis extends at or near a bending point or edge of the angled lever. The second lever arm, which is angled in respect to the first lever arm, can actuate the piston rod of the damping element.

According to an alternative embodiment, it is suggested that the hinge assembly comprises at least two hinge levers, wherein a first hinge lever is connected to the first hinge part pivotable about a first hinge axis and connected to the second hinge part pivotable about a second hinge axis, and a second hinge lever is connected to the first hinge part pivotable about a third hinge axis and connected to the second hinge part pivotable about a fourth hinge axis, wherein the first hinge lever forms the second component of the furniture hinge which is connected to the piston rod of the damping element at least towards the end of the opening movement and/or the closing movement and actuates the damping element. Preferably, the first and third hinge axes as well as the second and fourth hinge axes are spaced apart from one another. The first hinge lever forms the second component of the furniture hinge which is connected to the piston rod of the damping element at least towards the end of the opening movement and/or the closing movement and actuates the damping element. The first hinge lever is mounted on the one hand on the first hinge axis of the hinge cup and on the other hand on the second hinge axis of the hinge arm. The second hinge lever is mounted on the one hand on the third hinge axis of the hinge cup and on the other hand on the fourth hinge axis of the hinge arm. The hinge levers can have a planar, i.e. in a longitudinal section a straight, extension. Preferably, however, at least one of the hinge levers is curved or bent in a longitudinal section. At least the first hinge lever is preferably designed as an angled lever. In this case, the first hinge axis preferably runs at one end of a first lever arm and the second hinge axis runs at a bending point or edge of the angled lever. The second lever arm of the angle lever, which is angled in respect to the first lever arm, can actuate the piston rod of the damping element.

Preferably, the first hinge axis and the third hinge axis are arranged on the hinge cup at a first distance from each other. Likewise, preferably, the second hinge axis and the fourth hinge axis are arranged on the hinge arm at a second distance from each other. The first and second distances may be equal, but preferably are different.

The hinge axes may be formed by holes or eyelets formed in the at least one hinge arm, through which hinge shafts are guided. The shafts are mounted in the hinge cup, the hinge arm or in another component of the furniture hinge connected to the hinge cup or the hinge arm, and thus ensure articulation of the at least one hinge lever in respect to the corresponding components (i.e. hinge cup, hinge arm or component connected thereto) of the furniture hinge.

According to another advantageous embodiment of the present invention, it is suggested that hinge part to which the cylinder of the damping element is not fastened, or a second component of the furniture hinge connected to that hinge part, is fastened to the piston rod of the damping element pivotable about an articulation axis. If the damping element is actuated, for example, by means of a hinge lever of the hinge assembly, the hinge lever could be pivotably articulated to the piston rod via the articulation axis. The articulation axis can, for example, be formed by a hole formed in the piston rod, through which an articulation shaft is guided, which is mounted in the hinge lever. For this purpose, the hinge lever can have one or more eyelets or one or more holes through which the articulation shaft is guided. An eyelet can be formed, for example, by bending one end of a lever arm of the hinge lever around a bending axis running transversely to the longitudinal extension of the hinge lever. A hole may be formed, for example, by drilling or punching in one or more lateral tabs of a lever arm of the hinge lever, wherein the lateral tabs may be formed by bending lateral portions of the lever arm about a bending axis extending parallel to the longitudinal extension of the hinge lever.

According to a further preferred embodiment of the present invention, it is suggested that the second component of the furniture hinge is fastened to the piston rod of the damping element pivotable about an articulation axis, wherein a surface of the furniture body to which the mounting piece is attached defines a first plane, wherein a second plane is defined which extends parallel to the first plane and passes through the second hinge axis, wherein a third plane is defined which extends parallel to the first plane and passes through the fourth hinge axis, and wherein the articulation axis is located between the second plane and the third plane throughout the entire opening movement and/or closing movement of the furniture hinge. This design of the furniture hinge allows for a particularly compact construction.

Advantageously, in a fully closed position of the furniture hinge, the articulation axis is arranged close to a straight line connecting the second hinge axis with the fourth hinge axis, and a distance of the articulation axis to the connecting straight line increases continuously during the entire opening movement of the furniture hinge. Accordingly, the pivot angle of the cylinder of the damping element about the pivot axis relative to the component of the furniture hinge to which the cylinder is pivotably fastened also changes continuously during the entire opening movement of the furniture hinge.

According to a further advantageous embodiment of the invention, it is suggested that the second hinge part is movably fastened to the mounting piece attached to the furniture body and can be fixed to the mounting piece in a relative position in respect to the mounting piece, so that by changing the relative position between the second hinge part and the mounting piece the furniture door or flap can be adjusted in at least one direction relative to the furniture body or to an adjacent door or flap of the piece of furniture. The second hinge part is preferably the hinge arm.

For example, the hinge arm may be held to the mounting piece by means of at least one screw. By loosening the screw, a longitudinal displaceability of the hinge arm with respect to the mounting piece in a direction parallel to a longitudinal extension of the hinge arm could be released. By longitudinally displacing the hinge arm (together with the components of the furniture hinge and the furniture door or flap attached thereto), an offset of the closed furniture door or flap in respect to the furniture body or an adjacent door or flap of the piece of furniture can be adjusted. When the offset is set correctly, the at least one screw can be tightened again so that the hinge arm is fixed to the mounting piece in the respective position relative to the mounting piece.

Furthermore, it is conceivable to adjust a distance of at least a part of the hinge arm in respect to the mounting piece by means of another screw which is guided in the hinge arm and supported on the mounting piece. By turning this screw, the closed furniture door or flap can be displaced in respect to the furniture body or an adjacent door or flap of the piece of furniture along its surface extension. This can be used, for example, to adjust a gap width between the furniture door or flap and the furniture body or an adjacent door or flap of the piece of furniture. If the door or flap is attached to the furniture body by means of a plurality of furniture hinges, the door or flap can also be raised if only the distance of the lower furniture hinge is increased and/or that of the upper furniture hinge is reduced. Similarly, by turning the screw in the opposite direction and/or by increasing the distance of the upper furniture hinge, the door or flap can also be lowered.

Another advantageous embodiment of the invention provides that the second hinge part is releasably attached to the mounting piece attached to the furniture body, so that by releasing the attachment of the second hinge part to the mounting piece, the furniture door or flap is releasable from the furniture body. The releasable or detachable attachment of the second hinge part to the mounting piece can be realised in different ways. Various embodiments of a releasable attachment of a hinge arm to a mounting piece are known from the prior art. Preferably, the hinge arm has a spring-loaded movable latching element which, when the hinge arm is placed on the mounting piece, engages behind a section of the mounting piece and secures the hinge arm to the mounting piece. The latching element is preferably linearly movable, in particular in the direction of the longitudinal extension of the hinge arm. A spring force presses the latching element into the engaging position and prevents unintentional release of the hinge arm from the mounting piece. To release the hinge arm from the mounting piece, the latching element must be actuated against the spring force, e.g. by a user's finger or a suitable tool, so that it no longer engages behind the section of the mounting piece. Preferably, when the hinge arm is placed on the mounting piece for attachment, the latching element automatically and self-actuates into the engaging position.

A releasable attachment of the hinge arm to the mounting piece is possible in the present invention, since the cylinder of the damper element is not attached to the mounting piece, but instead to a component of the furniture hinge, e.g. the hinge arm or the hinge cup or a component fixedly attached thereto, which is detached from the mounting piece together with the hinge arm. In the invention, by detaching the hinge arm from the mounting piece, the complete furniture hinge, except for the mounting piece, is separated from the furniture body. Previously made settings and proper functioning of the furniture hinge are fully retained, so that after the hinge arm is placed and fastened to the mounting piece again, the furniture hinge is immediately fully functional again. This applies in particular to the function of the damping element.

Advantageously, the furniture hinge comprises at least one spring element which supports the opening movement and/or the closing movement at least towards the end of the movement and urges the furniture door or flap into an open position and/or a closed position in respect to the furniture body. The furniture hinge according to the invention thus combines the function of a damping hinge with that of a spring hinge. Preferably, the spring element is formed as a torsion spring made of metal, in particular of steel. This allows a particularly compact design of the furniture hinge despite its multifunctionality. The spring element is preferably mounted pre-tensioned in the hinge and presses the furniture door or flap into the closed position. Preferably, the spring element on the one hand leans on the second hinge part (i.e. the hinge arm) or on a third component of the furniture hinge connected to the second hinge part and on the other hand on the first hinge part (i.e. the hinge cup) or on a fourth component of the furniture hinge connected to the first hinge part. For example, it is conceivable that the spring element is supported on the one hand by the hinge arm and on the other hand by a hinge lever of the hinge assembly, preferably by the first hinge lever in the case of a multiple-lever hinge assembly. In particular, it is suggested that the spring element is supported, on the other hand, by the first hinge axis via which the first hinge lever is articulated to the hinge cup, or on a corresponding hinge shaft which is guided through holes in side walls of the hinge cup and holes or an eyelet in the first hinge lever. The hinge shaft is thus rigidly connected to the hinge cup. It is also possible that on the other hand, the spring element is supported on the first hinge axis or the corresponding hinge shaft during a first part of an opening movement and/or closing movement of the furniture hinge, and on the third hinge axis or the corresponding hinge shaft during a further part of the opening movement and/or closing movement. The second hinge lever is articulated to the hinge cup by means of the third hinge axis. The hinge shaft corresponding to the third hinge axis is guided through holes in the side walls of the hinge cup and holes or an eyelet in the second hinge lever. The hinge shaft is thus rigidly connected to the hinge cup.

The pivotable attachment of the cylinder of the damping element to one of the hinge parts or to the first component of the furniture hinge, which is rigidly connected to one of the hinge parts, can be realised in different ways. Preferably, a bearing element is arranged on an outer circumferential surface of the cylinder of the damping element between the ends of the cylinder, by means of which bearing element the cylinder of the damping element is pivotably fastened to the second hinge part or to the first component of the furniture hinge rigidly connected to the second hinge part. The bearing element may be integrally formed in one piece with the cylinder. Alternatively, the bearing element could be a separate part that is attached to the outer circumferential surface of the cylinder, for example by means of welding, soldering, gluing, riveting, screwing, etc. Preferably, the bearing element has two bearing parts of the same type, with one bearing part arranged on each side of a vertical centre plane through the cylinder along its longitudinal axis. This allows symmetrical loading of the damping element when force is applied to the piston rod during the opening movement and/or closing movement of the furniture hinge. Each bearing part may be provided with a hole through which a pivot shaft is guided. The pivot shaft may further extend laterally through respective holes provided in side walls of the hinge arm and secured in respect to the hinge arm.

Preferably, the pivot axis of the pivotable attachment of the cylinder of the damping element to the hinge part or the first component attached thereto, extends at a distance from a longitudinal axis of the cylinder of the damping element. If the cylinder is pivotably attached to the second hinge part, the pivot axis of the pivotable attachment of the cylinder to the second hinge part extends at a distance from a longitudinal axis of the cylinder of the damping element. The pivot axis runs essentially centrally between the two ends of the cylinder. The pivotable attachment is preferably located essentially in the middle between the two opposite ends of the cylinder. This causes a relatively small pivoting movement of the cylinder of the damping element during the opening movement and closing movement of the furniture hinge, whereby the size and the required installation space for the furniture hinge can be further reduced.

Further features and advantages of the present invention are explained in more detail below with reference to the figures, which show preferred embodiments of the invention. It is noted that the features shown in the figures and described below may each be essential to the invention also on their own, even if not expressly shown in the figures and not expressly described in the description. Furthermore, the features shown in the individual figures can be combined with each other in any possible way, even if the features belong to different embodiments and the combination is not explicitly mentioned in the description. Finally, one or more of the features shown in the figures and described in the description may also be omitted if they are not necessary for the realisation of the invention. The figures show:

DETAILED DESCRIPTION

Figure 1:
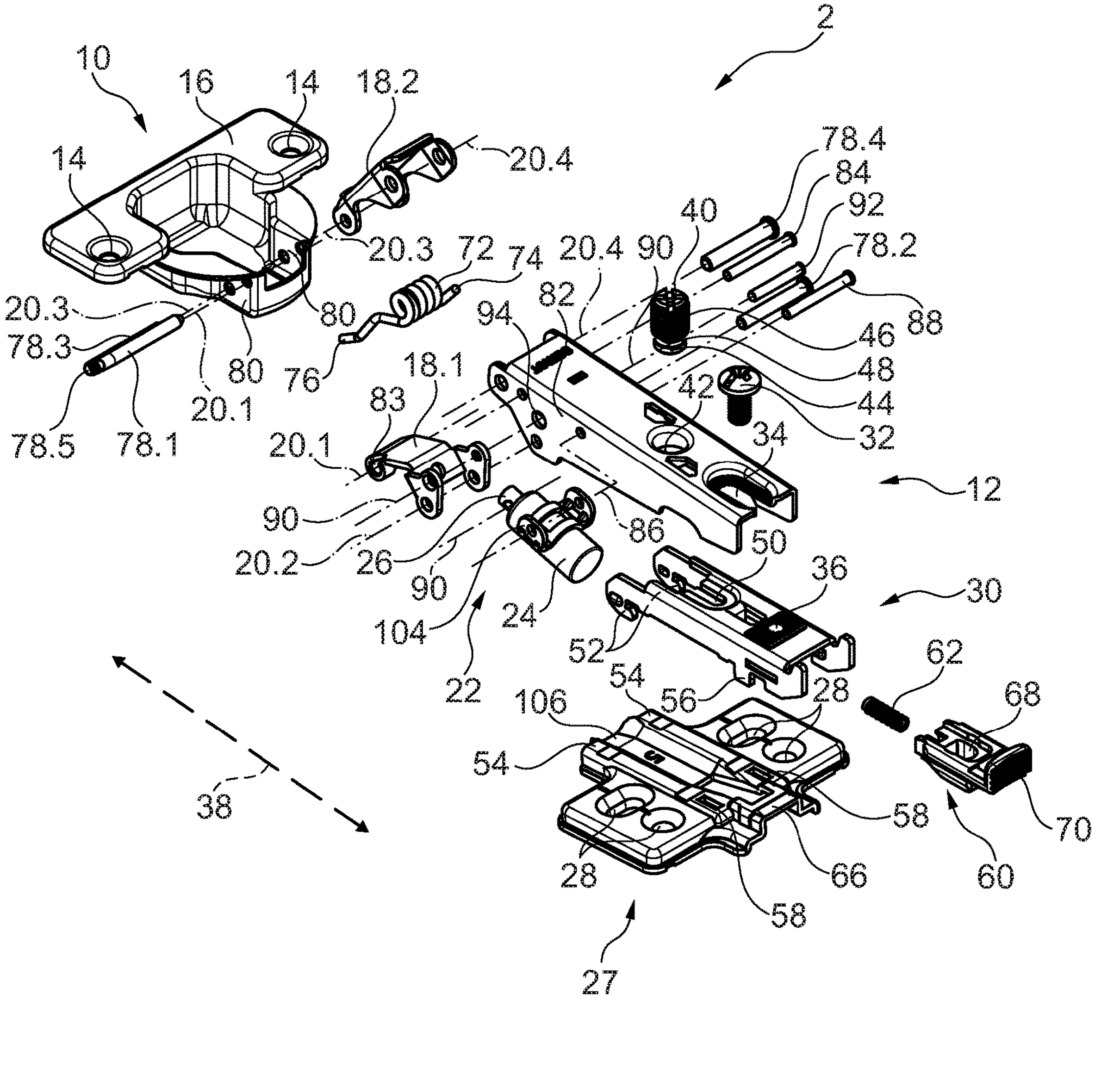
FIG. 1 a first embodiment of the furniture hinge according to the invention in an exploded view.
Figure 2:
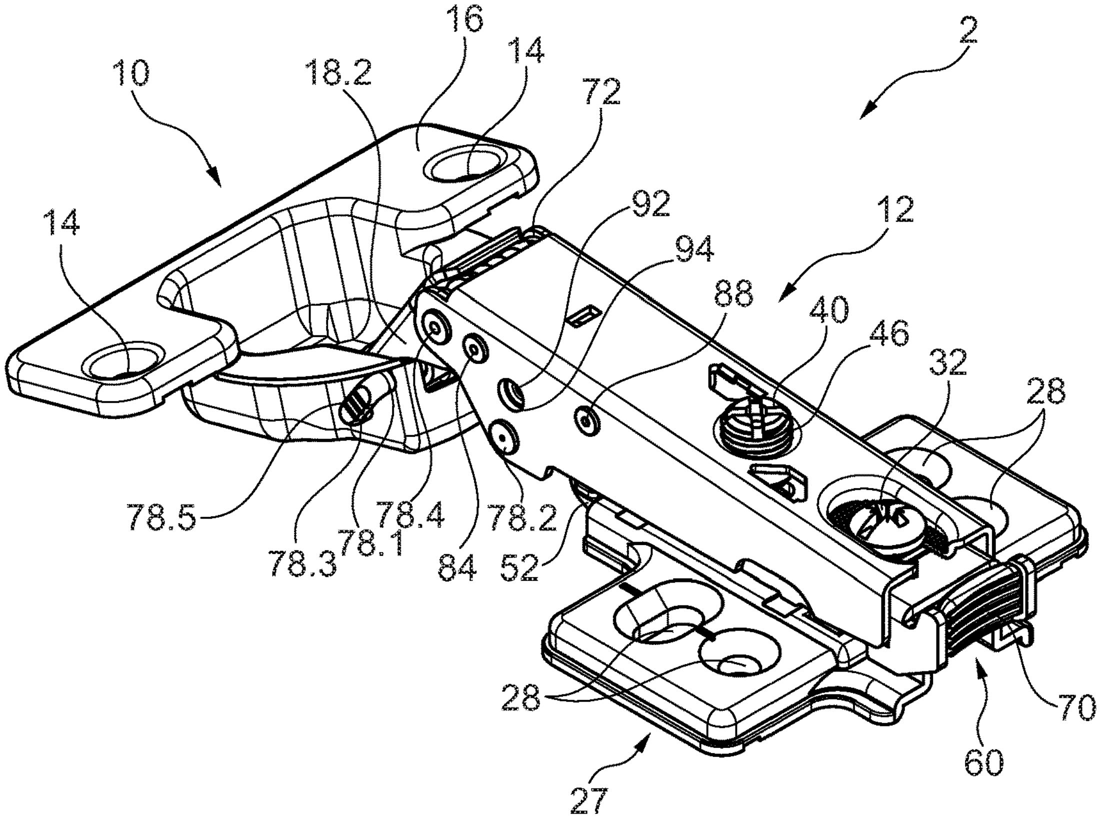
FIG. 2 the furniture hinge of FIG. 1 in an assembled state in a fully open position in a perspective view.

A furniture hinge according to a first preferred embodiment is shown in FIGS. 1 to 6 and designated in its entirety with reference sign 2. The furniture hinge 2 may serve for fastening a furniture door 4 or flap of a piece of furniture 6 to a furniture body 8 of the piece of furniture 6 in an articulated manner (see FIG. 3). The furniture hinge 2 comprises a first hinge part 10 for attachment to the furniture door 4 or flap, and a second hinge part 12 for attachment to the furniture body 8.

The first hinge part 10 may be designed as a hinge cup, which can be placed in a recess on the inside of the furniture door 4 or flap and fastened thereto in a known manner, for example by means of screws (not shown). The screws are guided through holes 14 which are provided in a collar 16 attached to or making an integral part of the hinge cup 10. The collar 16 lies on the inside surface of the door 4 or flap surrounding the recess. The second hinge part 12 may be designed as a hinge arm, which may be directly or indirectly attached to the furniture body 8 on the inside of the piece of furniture 6. The hinge arm 12 can be attached to the furniture body 8 in an adjustable manner and/or in an easily releasable manner, e.g. by means of a snap-in connection, which will be described in more detail below.

The furniture hinge 2 further comprises a hinge assembly 18 (18.1 and 18.2) which movably connects the first hinge part 10 to the second hinge part 12 in order to realise an opening movement of the furniture hinge 2, in which the first hinge part 10 moves away from the second hinge part 12, and an oppositely directed closing movement of the furniture hinge 2. The hinge assembly 18 may comprise one or more hinge levers 18.1, 18.2 on one side attached to the hinge cup 10 and on the opposite side to the hinge arm 12 in an articulated manner. Several hinge levers 18.1, 18.2 preferably extend parallel or slightly oblique to each other. The hinge levers 18.1, 18.2 may have a flat extension or, in a longitudinal section, a straight extension (see second hinge lever 18.2). Alternatively, in a longitudinal section, they may have a curved or bent extension (see first hinge lever 18.1). The hinge assembly 18 connects the components of the furniture hinge 2 associated with the hinge cup 10 to the components of the furniture hinge 2 associated with the hinge arm 12.

In the shown embodiments, the hinge assembly 18 comprises two hinge levers 18.1, 18.2. A first hinge lever (internal hinge lever) 18.1 is connected to the first hinge part 10 pivotable about a first hinge axis 20.1 and connected to the second hinge part 12 pivotable about a second hinge axis 20.2. A second hinge lever 18.2 is connected to the first hinge part 10 pivotable about a third hinge axis 20.3 and to the second hinge part 12 pivotable about a fourth hinge axis 20.4. The first hinge axis 20.1 and the third hinge axis 20.3 are spaced apart from each other by a first distance. The second hinge axis 20.2 and the fourth hinge axis 20.4 are spaced apart from each other by a second distance. Preferably, the two distances are different from each other.

In the shown embodiments, the hinge axes 20 are realized by means of hinge shafts 78 which extend through holes provided in side walls 80 of the first hinge part 10 or in side walls 82 of the second hinge part 12. In particular, a first hinge shaft 78.1 extends through holes in the side walls 80 of the hinge cup 10 and through respective holes or an eyelet 83 in the first hinge lever 18.1 defining the first hinge axis 20.1, a second hinge shaft 78.2 extends through holes in the side walls 82 of the hinge arm 12 and through respective holes or an eyelet in the first hinge lever 18.1 defining the second hinge axis 20.2, a third hinge shaft 78.3 extends through holes in the side walls 80 of the hinge cup 10 and respective holes or an eyelet in the second hinge lever 18.2 defining the third hinge axis 20.3, and a fourth hinge shaft 78.4 extends through holes in the side walls 82 of the hinge arm 12 and respective holes or an eyelet in the second hinge lever 18.2 defining the fourth hinge axis 20.4. In the embodiments the first and third hinge shafts 78.1, 78.3 are attached to each other forming a single U-shaped hinge element 78.5.

Furthermore, the furniture hinge 2 comprises at least one damping element 22 for damping the opening movement and/or the closing movement of the furniture hinge 2 at least towards the end of the movement. The damping element 22 comprises an external cylinder 24, a piston (not visible) which is linearly movable inside the cylinder 24 relative thereto, and a piston rod 26 which is coupled to the piston and projects from the cylinder 24.

Finally, the furniture hinge 2 of the first embodiment comprises a plate-like mounting piece 27 which is attached to the furniture body 8 and to which the second hinge part 12 may be attached. For example, the mounting piece 27 may be attached to the furniture body 8 by means of screws, which pass through holes 28 provided in the mounting piece 27. Other ways of attachment of the mounting piece 27 to the furniture body 8 are conceivable, too. The hinge arm 12 may be attached to the mounting piece 27 directly or indirectly in a rigidly fixed manner or in an adjustable manner and/or in a releasable manner.

In the first embodiment of FIGS. 1 to 6, the second hinge part 12 is attached to the mounting piece 27 not directly but rather by means of an intermediate piece 30. The intermediate piece 30 provides for a releasable attachment of the hinge arm 12 to the mounting piece 27, which will be described in further detail below. Furthermore, the hinge arm 12 is adjustable in respect to the intermediate piece 30, in order to adjust the position, offset and/or orientation of the closed door 4 or flap in respect to the furniture body 8 or an adjacent door or flap of the piece of furniture 6.

In order to realize the adjustment of the furniture hinge 2, the hinge arm 12 can be attached to the intermediate piece 30, e.g. by means of a fastening screw 32. The screw 32 is guided through a guiding slot 34 provided in a top wall of the hinge arm 12 and then screwed into a threaded hole 36 provided in a top surface of the intermediate piece 30. The slot 34 allows a movement of the hinge arm 12 in respect to the intermediate piece 30 in a longitudinal direction 38 when the screw 32 is slightly loosened. By tightening the screw 32 the relative position of the hinge arm 12 in respect to the intermediate piece 30 is fixed.

Figure 3:
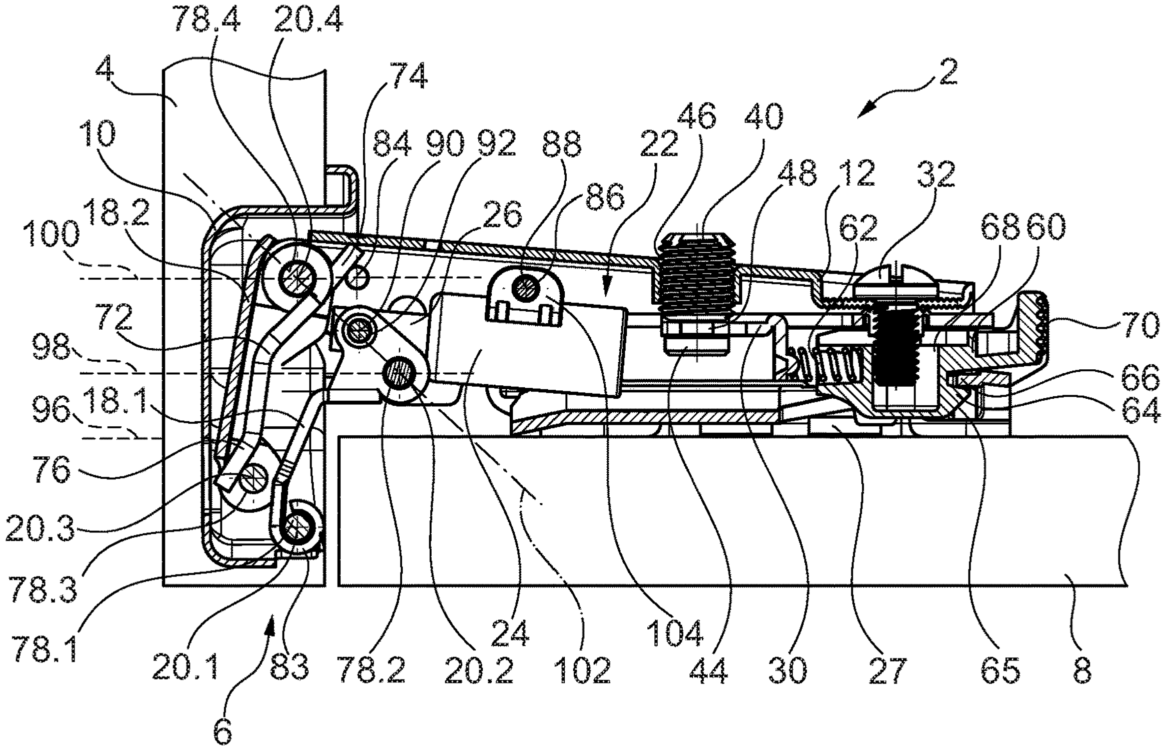
FIG. 3 the furniture hinge of FIG. 1 in an assembled state in a fully closed position in a partial longitudinal sectional side view.
Figure 4:
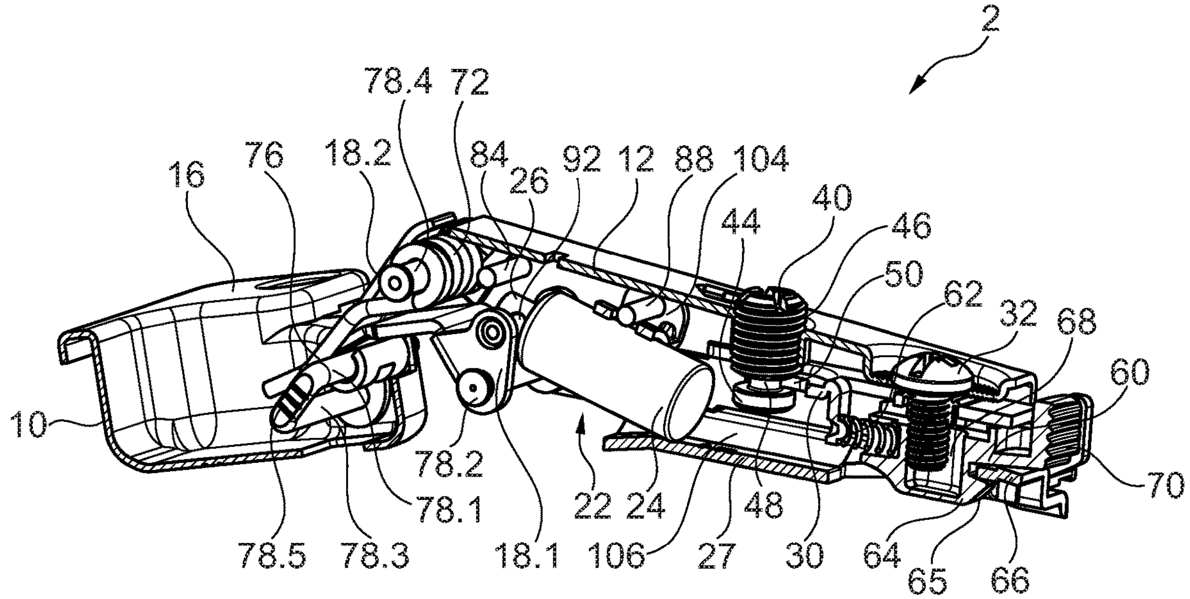
FIG. 4 the furniture hinge of FIG. 2 in a partial longitudinal sectional perspective view.
Figure 5:
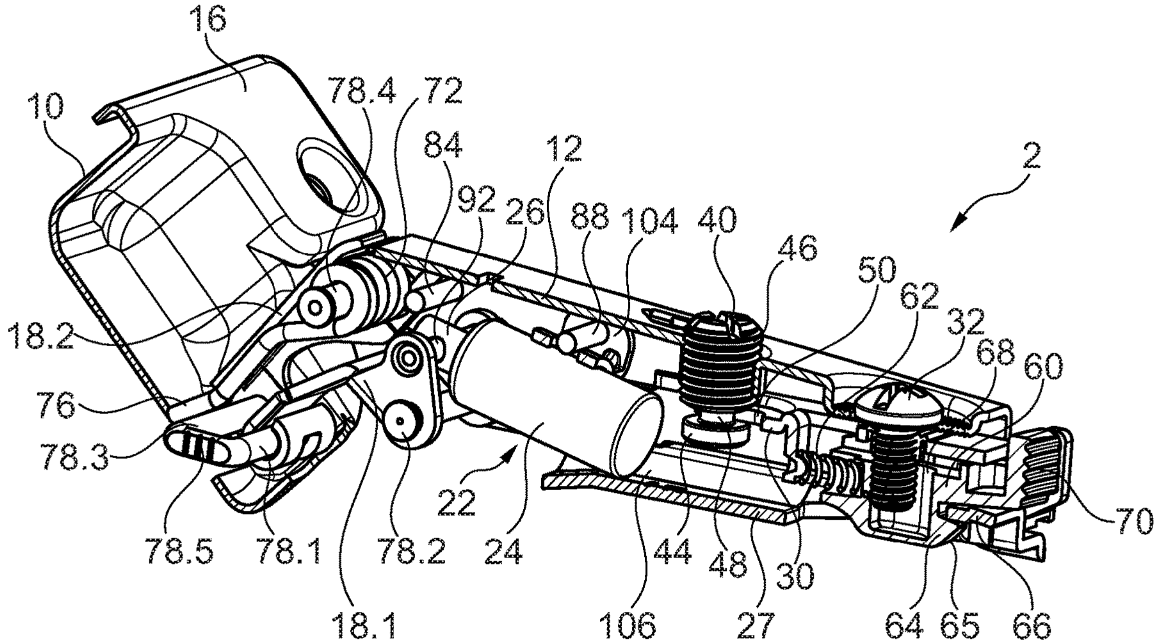
FIG. 5 the furniture hinge of FIG. 4 in an intermediate position.
Figure 6:
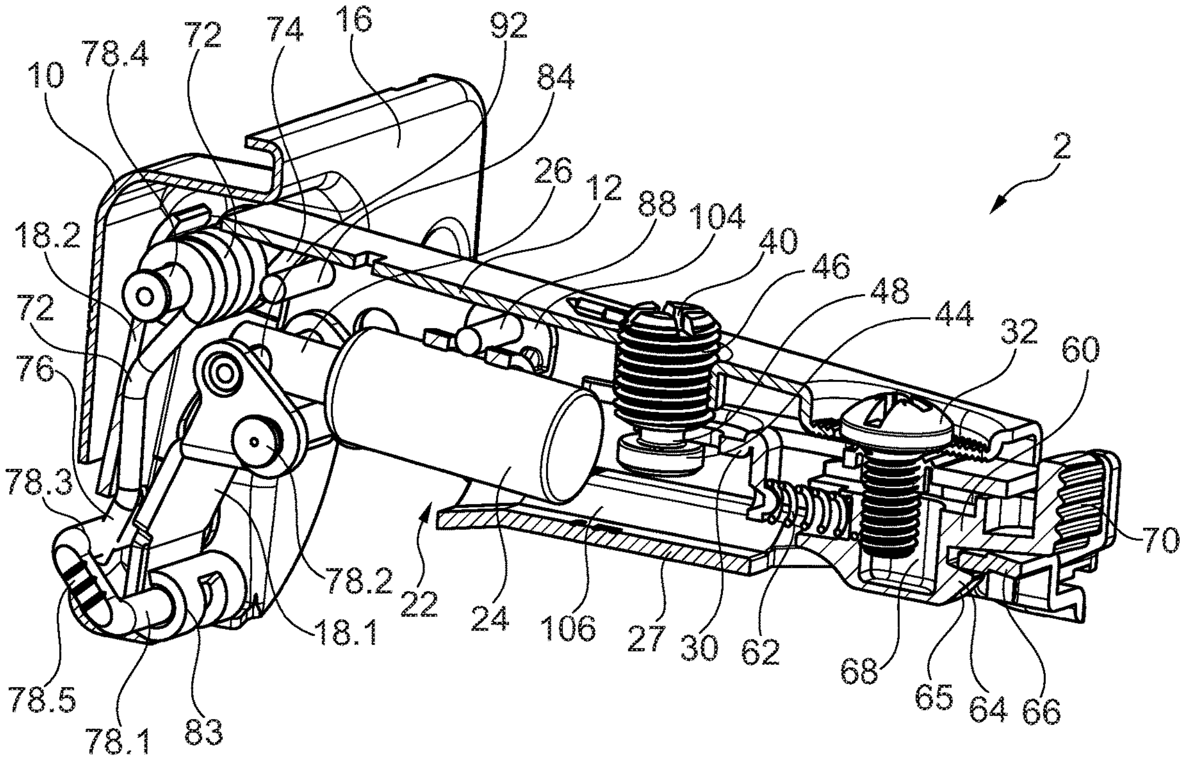
FIG. 6 the furniture hinge of FIG. 4 in a fully closed position.
Figure 7:
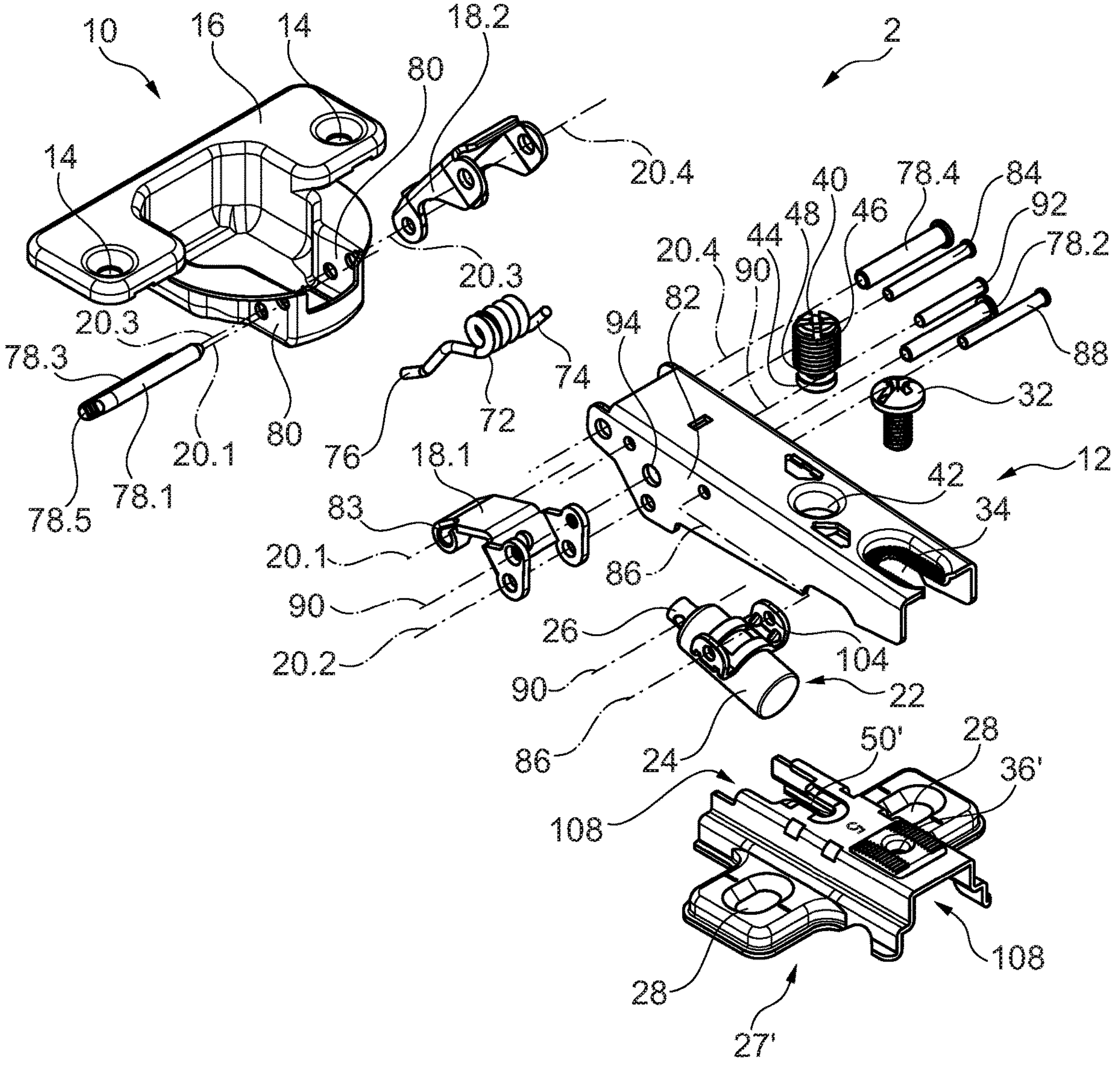
FIG. 7 a second embodiment of the furniture hinge according to the invention in an exploded view.
Figure 8:
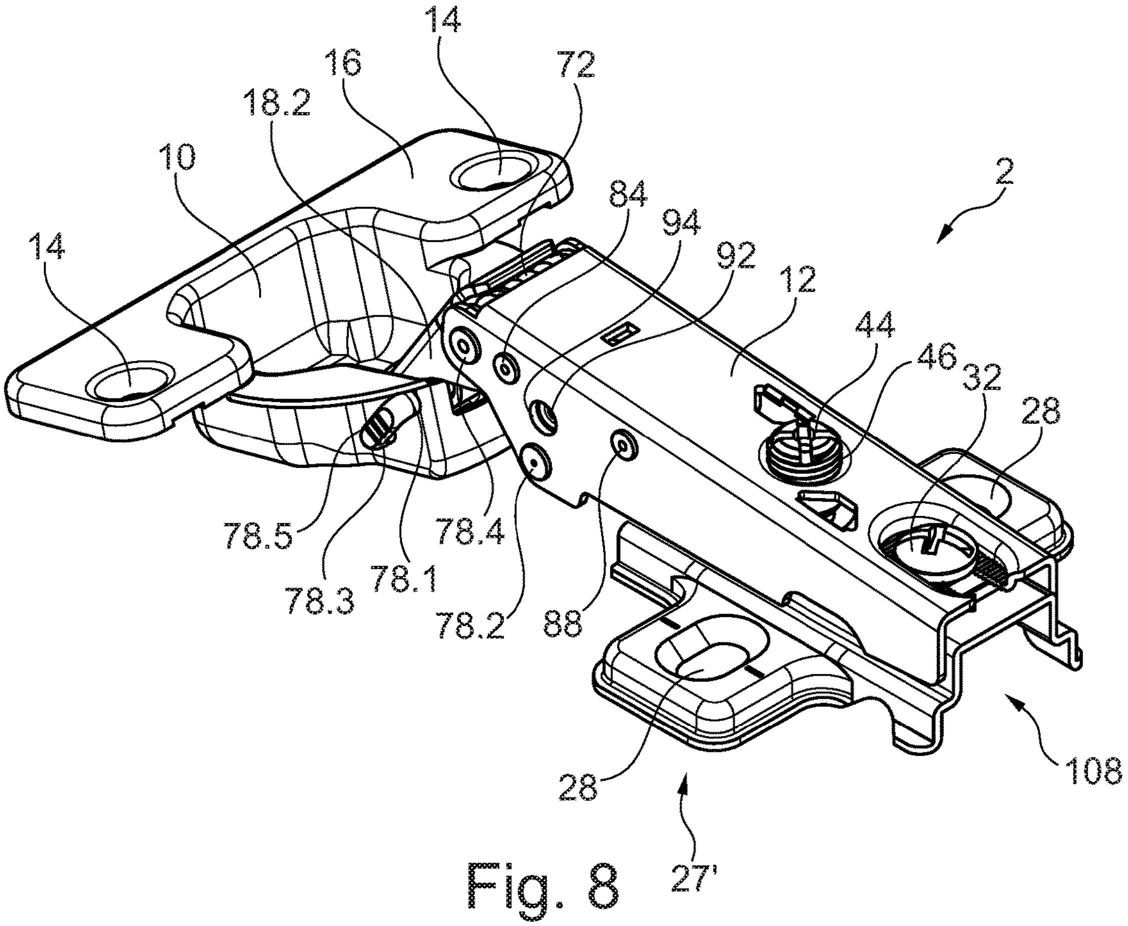
FIG. 8 the furniture hinge of FIG. 7 in an assembled state in a fully open position in a perspective view.
Figure 9:
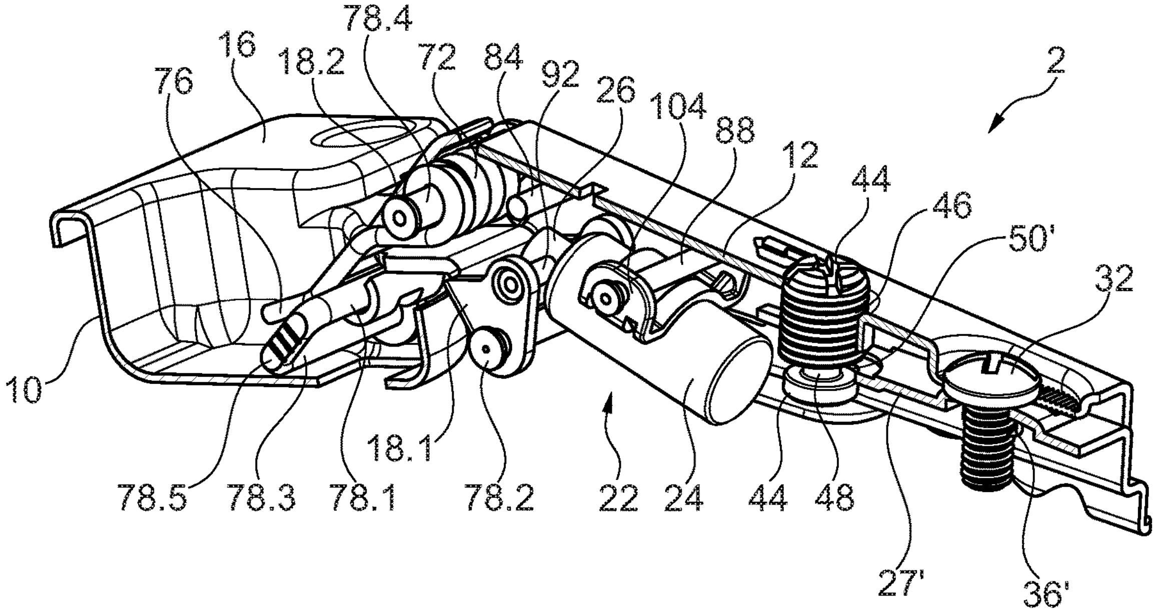
FIG. 9 the furniture hinge of FIG. 8 in a partial longitudinal sectional perspective view.
Figure 10:
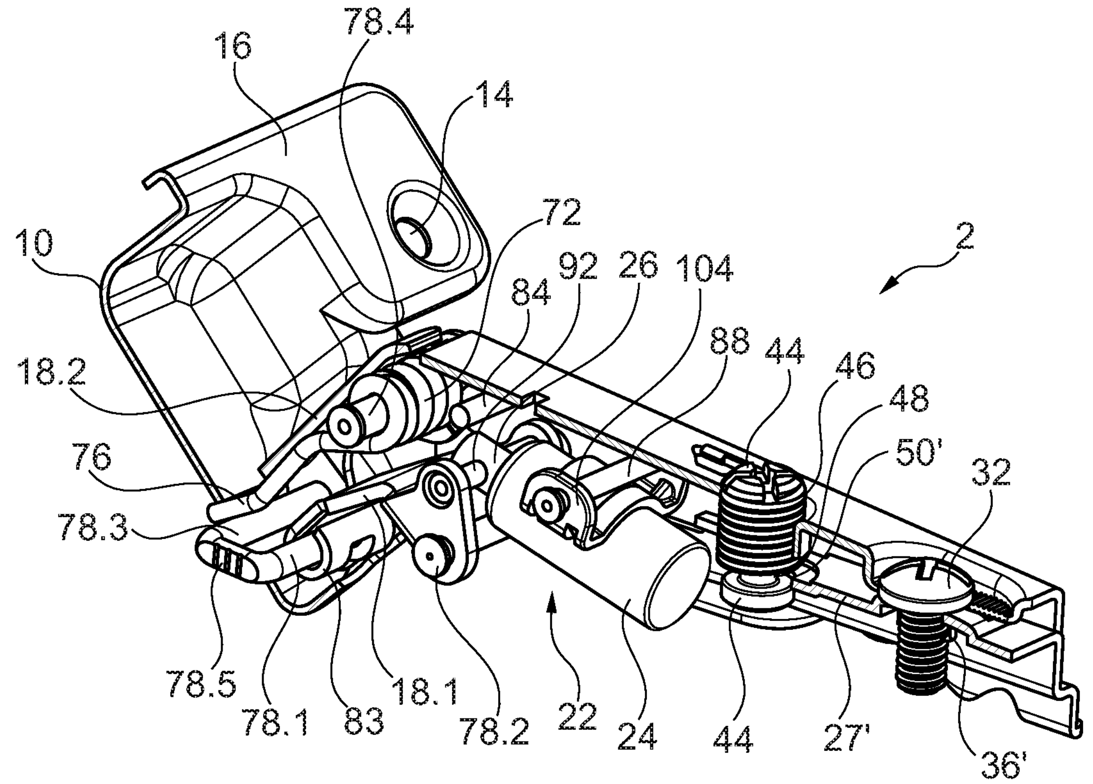
FIG. 10 the furniture hinge of FIG. 9 in an intermediate position.
Figure 11:
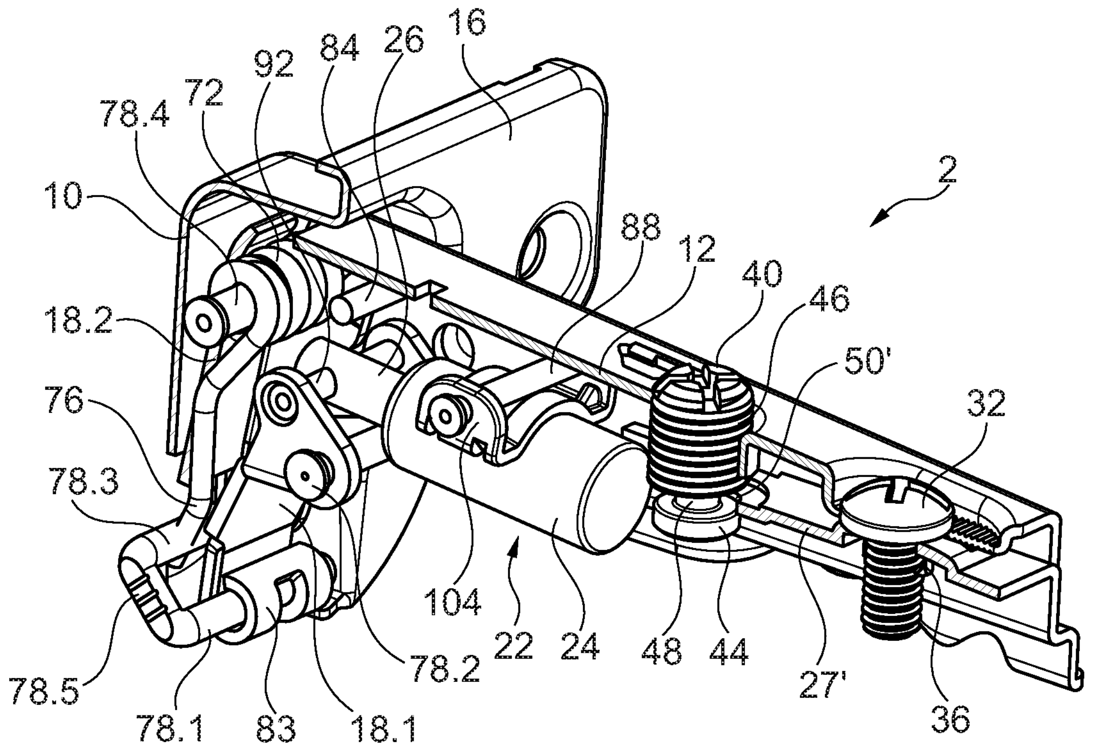
FIG. 11 the furniture hinge of FIG. 9 in a fully closed position.

Furthermore, an adjustment screw 40 is provided which is screwed into a threaded hole 42 provided in the top surface of the hinge arm 12 so that it protrudes into the inside of the hinge arm 12 (see FIG. 3). A bottom distal end of the adjustment screw 40 has a collar 44 which is separated from a threaded section 46 of the screw 40 by a necked region 48 (see FIG. 3). When mounting the hinge arm 12 onto the intermediate piece 30, the necked region 48 is inserted into a slot 50 provided in the top surface of the intermediate piece 30. After the hinge arm 12 is mounted to the intermediate piece 30 and the screw 32 is fastened, the adjustment screw 40 may be actuated, i.e. turned in one direction or the other, thereby increasing or decreasing a distance of the top surface of the hinge arm 12 in respect to the intermediate piece 30.

Thus, by turning the adjustment screw 40, the closed furniture door 4 or flap can be displaced in respect to the furniture body 8 or an adjacent door or flap of the piece of furniture 6, the displacement being effected parallel to the surface extension of the door 4 or flap. This can be used, for example, to adjust a gap width between the furniture door 4 or flap and the furniture body 8 or an adjacent door or flap of the piece of furniture 6. If the door 4 or flap is attached to the furniture body 8 by means of a plurality of furniture hinges 2, the door 4 or flap can also be raised if only the distance between hinge arm 12 and intermediate piece 30 of the lower furniture hinge 2 is increased and/or that of the upper furniture hinge 2 is reduced. Similarly, by turning the adjustment screw 40 in the opposite direction and or by increasing the distance of the upper furniture hinge 2 or reducing the distance of the lower furniture hinge 2, the door 4 or flap can also be lowered.

With simple words, in this embodiment the hinge arm 12 comprises two separate elements (i.e. hinge arm 12 and intermediate piece 30), which are attached to each other adjustable in respect to each other in the longitudinal direction 38 (when the screw 32 is loosened) and which can be fixed to each other in the adjusted relative position (when the screw 32 is tightened). Further, the adjustment screw 40 serves for adjustment of the distance between the two separate components 12 and 30 in a direction perpendicular to the longitudinal direction 38.

In order to realize the releasable attachment of the hinge arm 12 to the mounting piece 27 and to the furniture body 8, respectively, the intermediate piece 30 (with the hinge arm 12 attached thereto) is releasably attached to the mounting piece 27. This is achieved by a simple snap-in connection. To this end, it is suggested that the intermediate piece 30 comprises front hook-like elements 52, which are adapted to engage behind a first front holding section 54 of the mounting piece 27. Further, the intermediate piece 30 has positioning elements 56 facing towards the mounting piece 27, which are adapted to engage with a respective receiving section 58 of the mounting piece 27. The receiving section 58 preferably comprises slots or holes in the top surface of the mounting piece 27 into which the positioning elements 56 can be inserted.

A spring-loaded release element 60 is slidably guided in the intermediate piece 30. In this embodiment, the release element 60 is a push-button which is linearly movable in respect to the intermediate piece 30 in the longitudinal direction 38. Of course, the release element 60 could be designed differently from what is shown in FIGS. 1 to 6. The push-button 60 is pressed to the rear of the intermediate piece 30 by means of a pressure spring 62. As can be seen from FIG. 3, the push-button 60 has at least one, preferably two hook-like snap elements 64 which are adapted to engage with a second rear holding section 66 of the mounting piece 27. The snap elements 64 each have a slanted sliding surface 65 facing downwards towards the mounting piece 27 during attachment of the intermediate piece 30 to the mounting piece 27. When the intermediate piece 30 is lowered onto the mounting piece 27, the sliding surfaces 65 slide over the second holding section 66 and urge the push-button 60 forward overcoming the force of spring element 62 and letting the snap elements 64 engage with the second holding section 66 of the mounting piece 27. After engagement of the snap elements 64, the spring 62 presses and holds the push-button 60 in the engaged rear position. Further, the push-button 60 may have a recess 68 which opens into the top surface of the push-button 60 and which is adapted to receive a distal end with a threaded section of the fastening screw 32. Finally, the push-button 60 may be provided with an actuating surface 70 for actuating the push-button 60 by a user, e.g. with one of his fingers or a tool.

For attachment of the hinge arm 12 (and of all the other components of the furniture hinge 2 connected to the hinge arm 12, including the intermediate piece 30, the hinge assembly 18, the hinge cup 10 and the door 4 or flap) to the mounting piece 27, the hook-like elements 52 are brought into engagement with the first holding section 54 of the mounting piece 27. Then the rear part of the hinge arm 12 is swivelled downwards about an imaginary axis defined by the coupling of the hook-like elements 52 and the first holding section 54 and the positioning elements 56 are inserted into the receiving holes 58. Finally, the at least one snap element 64 of the push-button 60 is automatically brought into engagement with the second holding section 66 of the mounting piece. 27.

For detachment of the hinge arm 12 (and of all the other components of the furniture hinge 2 connected to the hinge arm 12) from the mounting piece 27, the push-button 60 is pressed forward against the force of the pressure spring 62. This results in a releasement of the engagement between the hook-like elements 64 and the second holding section 66 of the mounting piece 27. The rear part of the hinge arm 12 can be swivelled upwards about the imaginary axis defined by the coupling of the hook-like elements 52 and the first holding section 54 and then the hinge arm 12 can be moved forward thereby releasing the engagement between the hook-like elements 52 and the first holding section 54 of the mounting piece 27. Finally, the hinge arm 12 and all the other components of the furniture hinge 2 connected to the hinge arm 12 can be separated from the mounting piece 27 and from the furniture body 8.

Preferably, the furniture hinge 2 comprises at least one spring element 72 which supports the opening movement and/or the closing movement at least towards the end of the movement and urges the furniture door 4 or flap into an open position and/or a closed position in respect to the furniture body 8. In the shown embodiment, the furniture hinge 2 comprises one spring element 72 designed as a torsion spring, which supports the closing movement. A torsion spring allows a particularly compact design of the furniture hinge 2 despite its multifunctionality (functioning as a damping hinge and a spring hinge). The torsion spring 72 can be made of metal, in particular of steel. The torsion spring 72 can be wound around the fourth hinge shaft 78.4 and thereby positioned inside the hinge arm 12. The spring element 72 is preferably mounted in a pre-tensioned manner in the hinge 2 and urges and holds the furniture door 4 or flap in its closed position.

Preferably, on the one hand the spring element 72 leans with its first end 74 on the hinge arm 12 or on a third component of the furniture hinge 2 connected to the hinge arm 12, and on the other hand with its second end 76 on the hinge cup 10 or on a fourth component of the furniture hinge 2 connected to the hinge cup 10. For example, it is conceivable that the spring element 72 is supported with its first end 74 by the hinge arm 12 and/or by a support shaft 84 which is guided through holes in the side walls 82 of the hinge arm 12 and thereby fixedly connected to the hinge arm 12. The support shaft 84 provides for a steady connection of the spring element 72 to the hinge arm 12. It is further conceivable that the spring element 72 is supported with its second end 76 by one or more of the hinge levers 18.1, 18.2 of the hinge assembly 18, which are connected to the hinge cup 10 in an articulated manner, or by one or more of the hinge shafts 78.1, 78.3, which are fixedly connected to the hinge cup 10 and form the first and third hinge axes 20.1, 20.3 of the first and second hinge levers 18.1, 18.2, respectively. In particular, it is suggested that the second end 76 of the spring element 72 is supported by the U-shaped hinge element 78.5. Thus, in that case the second end 76 of the spring element 72 is supported by and slides along the first hinge shaft 78.1 during a first part of an opening movement and/or closing movement of the furniture hinge 2, and is supported by and slides along the third hinge shaft 78.3 during a further part of the opening movement and/or closing movement. This has the advantage that depending on the current opening or closing angle of the door 4 or flap in respect to the furniture body 8, different spring forces act on the hinge cup 10 and the door 4 or flap, respectively.

According to the present invention, the cylinder 24 of the damping element 22 is fastened to one of the hinge parts 10 or 12 or to a first component of the furniture hinge 2, which is connected to one of the hinge parts 10 or 12 at least during the opening movement and/or closing movement of the furniture hinge 2, pivotably about a pivot axis 86. In the shown embodiment, the cylinder 24 is fastened to the hinge arm 12 in a pivotable manner. This is realized by means of a pivot shaft 88, which is guided through holes in the side walls 82 of the hinge arm 12. Of course, alternatively, the damping element 22 could also be fastened to the hinge cup 10 or to the intermediate piece 30 pivotable about a pivot axis.

The pivotable attachment of the cylinder 24 of the damping element 22 to a component of the furniture hinge 2 other than the mounting piece 27 has several advantages. On the one hand, the cylinder 24 can change its pivot position relative to the component to which it is pivotally attached during an opening movement and/or closing movement of the furniture hinge 2. The change in position of the cylinder 24 can be defined, for example, by the movement of another component of the furniture hinge 2 which is attached to the piston rod 26 of the damping element 22 for actuating the damping element 22. This ensures that a majority of the forces acting on the piston rod 26 during the opening movement and/or closing movement of the furniture hinge 2 are always directed parallel to the direction of movement of the piston in the cylinder 24 of the damping element 22. Transverse forces acting on the piston rod 26 of the damping element 22 during the opening movement and/or closing movement are significantly reduced, if not completely eliminated. As a result, the mechanical stress on the damping element 22, in particular on a seal of the piston, on the piston itself and/or on a bearing of the piston or the piston rod 26 in the cylinder 24, is significantly reduced, which results in a longer service life of the damping element 22.

Furthermore, in the case of a furniture hinge 2 in which the hinge arm 12 is adjustably fastened to the mounting piece 27, the invention has the advantage that an adjustment of the position and/or orientation of the hinge arm 12 in respect to the mounting piece 27 does not result in a variation of the pivot axis 86 via which the cylinder 24 of the damping element 22 is pivotably fastened to the one hinge part 10 or 12 in respect to an articulation point (running through an articulation axis 90) on the piston rod 26 of the damping element 22. In this way, an undesired variation of the damping properties or damping characteristics of the damping element 22 due to adjustment of the hinge arm 12 in respect to the mounting piece 27 can be avoided.

Another component of the furniture hinge 2, which is arranged on the respective other side of the hinge assembly 18 in respect to the pivot axis 86, or a component of the hinge assembly 18 itself, can act on the piston rod 26 in the articulation point and provide for actuation of the damping element 22. Preferably, the other component acting on the piston rod 26 and actuating the damping element 22, is attached to the piston rod 26 pivotably about the articulation axis 90. To this end it is suggested that an articulation shaft 92 is inserted into the hinge arm 12 through holes 94 provided in the side walls 82 of the hinge arm 12 and guided through respective holes in the first hinge lever 18.1 and in the piston rod 26. During operation of the furniture hinge 2, the articulation shaft 92 is movable in respect to the hinge arm 12. The holes in the first hinge lever 18.1 and in the piston rod 26 are aligned with the holes 94 in the side walls 82 of the hinge arm 12 when the furniture hinge 2 is in its completely opened position (see FIG. 2). When the furniture hinge 2 is moved towards its closed position (see FIG. 3), the holes in the first hinge lever 18.1 and in the piston rod 26 are increasingly misaligned in respect to the holes 94 in the side walls 82 of the hinge arm 2.

Preferably, a pivot position of the cylinder 24 of the damping element 22 in respect to the one hinge part 10 or 12, to which the cylinder 24 is pivotably fastened, changes during the opening movement and/or closing movement of the furniture hinge 2. The pivot position of the cylinder 24 preferably changes continuously during the entire opening movement and/or closing movement between a fully closed position of the furniture hinge 2 and a fully opened position of the furniture hinge 2. However, it is also conceivable that the cylinder 24 is pivotably fastened to the one hinge part 10 or 12 in such a way that during the opening movement and/or closing movement, starting from an initial position of the furniture hinge 2, the pivot positon of the cylinder 24 increases (or decreases) and reaches a maximum value after part of the opening movement and/or closing movement, and then decreases (or increases) again in the further course of the opening movement and/or closing movement until the furniture hinge 2 reaches an end position.

Preferably, the other component of the furniture hinge 2 acting on the piston rod 26 and actuating the damping element 22, is movably connected to the hinge cup 10. In particular, it is suggested that the other component is formed by the first hinge lever 18.1. In this respect, it is advantageous that the furniture hinge 2 does not require any additional components that form a deflection gear or the like for a straight-line actuation of the piston rod 26 of the damping element 22. Instead, the first hinge lever 18.1 acts directly on the piston rod 26 and realises a direct actuation of the damping element 22.

In the described embodiments, the other component of the furniture hinge 2 (e.g. the first hinge lever 18.1) which acts on the piston rod 26 of the damping element 22 during the entire opening movement and/or closing movement and actuates the damping element 22, is pivotably attached to the piston rod 26. This has the advantage that the damping element 22 can be actuated both by pulling and by pushing on the piston rod 26. This enables damping of the furniture hinge 2 both during the opening movement and during the closing movement. While the second hinge lever 18.2 has an essentially planar extension, the first hinge lever 18.1 is preferably designed as an angled lever. In this case, the first hinge axis 20.1 through the eyelet 83 runs at one end of a first lever arm and the second hinge axis 20.2 runs along a bending edge of the angled lever 18.1. The second lever arm of the angled lever 18.1 extends in an angle in respect to the first lever arm and actuates the piston rod 26 of the damping element 22. To this end, holes are provided at the distal end of the second lever arm through which the articulation axis 90 runs.

The hinge axes 20 may be formed by holes or eyelets 83 formed in the hinge levers 18.1, 18.2 and the respective holes in the side walls 80 of the hinge cup 10 or in the side walls 82 of the hinge arm 12, respectively. The hinge shafts 78 are guided there through and mounted (fixed or attached) to the hinge cup 10 or hinge arm 12, respectively. The shafts 78 are mounted in the respective holes in the side walls 80, 82 of the hinge cup 10 or the hinge arm 12, for example, by means of soldering, welding or by compression of the distal ends of the shafts 78 so that their diameter expands and they are clamped in the holes of the hinge cup 10 or the hinge arm 12. Similarly, the pivot axis 86 is defined by holes in the cylinder 24 (or in a bearing element 104 attached thereto) and respective holes in the side walls 82 of the hinge arm 12. The pivot shaft 88 is mounted in the respective holes in the side walls 82 of the hinge arm 12, for example, by means of soldering, welding or by compression of the distal ends of the shaft 88. Similarly, the articulation axis 90 is defined by holes in the distal end of the second lever arm of the first hinge lever 18.1 and a hole in the piston rod 26. The articulation shaft 92 is mounted in the respective holes in the in the distal end of the second lever arm of the first hinge lever 18.1, for example, by means of soldering, welding or by compression of the distal ends of the shaft 92.

A surface of the furniture body 8 to which the mounting piece 27 is attached defines an imaginary first plane 96 (see FIG. 3), a second imaginary plane 98 is defined which extends parallel to the first plane 96 and passes through the second hinge axis 20.2, and a third imaginary plane 100 is defined which also extends parallel to the first plane 96 and passes through the fourth hinge axis 20.4. The articulation axis 90 is located between the second plane 98 and the third plane 100 throughout the entire opening movement and/or closing movement of the furniture hinge 2. This design of the furniture hinge 2 allows for a particularly compact construction.

Advantageously, in a fully closed position of the furniture hinge 2 (see FIG. 3), the articulation axis 90 is arranged close to or even on a straight line 102 connecting the second hinge axis 20.2 with the fourth hinge axis 20.4. A distance of the articulation axis 90 to the connecting straight line 102 increases continuously during the entire opening movement of the furniture hinge 2. Accordingly, the pivot angle of the cylinder 24 of the damping element 22 about the pivot axis 86 in respect to the component of the furniture hinge 2 to which the cylinder 24 is pivotably fastened (e.g. the hinge arm 12) changes continuously during the entire opening movement and the entire closing movement of the furniture hinge 2.

A releasable attachment of the hinge arm 12 to the mounting piece 27 is possible in the present invention, since the cylinder 24 of the damper element 22 is not attached to the mounting piece 27, but instead to a hinge part 10, 12 of the furniture hinge 2 or to the first component fixedly attached thereto, which will be detached from the mounting piece 27 together with the hinge arm 12. In the invention, by detaching the hinge arm 12 from the mounting piece 27, the complete furniture hinge 2, except for the mounting piece 27, is separated from furniture body 8. Previously made settings and proper functioning of the furniture hinge 2 are fully retained, so that after the hinge arm 12 is placed back and fastened to the mounting piece 27 again, the furniture hinge 2 is immediately fully operable again. This applies in particular to the function of the damping element 22.

The pivotable attachment of the cylinder 24 of the damping element 22 to one of the hinge parts 10, 12 or to the first component of the furniture hinge 2, which is rigidly connected to one of the hinge parts 10, 12, can be realised in different ways. Preferably, the bearing element 104 is arranged on an outer circumferential surface of the cylinder 24 of the damping element 22 between the ends of the cylinder 24. By means of the bearing element 104 the cylinder 24 is pivotably fastened to the second hinge part 12 or to the first component of the furniture hinge 2. The bearing element 104 may be integrally formed in one piece with the cylinder 24. Alternatively, the bearing element 104 could be a separate part that is attached to the outer circumferential surface of the cylinder 24, for example by means of welding, soldering, gluing, riveting, screwing, etc.

Preferably, the bearing element 104 has two bearing parts of the same type, with one bearing part arranged on each side of a vertical centre plane through the cylinder 24 along its longitudinal axis. The bearing parts each have an essentially planar extension parallel to each other. The two bearing parts allow symmetrical loading of the damping element 22 when force is applied to the piston rod 26 during the opening movement and/or closing movement of the furniture hinge 2. Each bearing part of the bearing element 104 may be provided with a hole through which the pivot shaft 88 is guided.

Preferably, the hinge cup 10, the hinge arm 12, the intermediate piece 30, the mounting piece 27 and the hinge levers 18.1, 18.2 are made of metal, in particular steel. It is further suggested that the hinge cup 10 and the mounting piece 27 are manufactured from a sheet metal by means of a punching process and a subsequent deep-drawing process. The hinge arm 12, the intermediate piece 30, and the hinge levers 18.1, 18.2 are preferably manufactured from a sheet metal by means of a punching process and a subsequent bending process. By bending lateral portions of the punched-out sheet metal along a bending axis extending parallel to the longitudinal direction 38 the side walls 82 of the hinge arm 12, side walls of the intermediate piece 30 and lateral tabs of the hinge levers 18.1, 18.2 can be formed. Thus, for example, the hinge arm 12 comprises two side walls 82 extending parallel to each other and each comprising the holes for defining the second and fourth hinge axes 20.2, 20.4, the pivot axis 86, and for inserting the support shaft 84 and the articulation shaft 92. Similarly, the second lever arm of the first hinge lever 18.1 comprises two lateral tabs extending parallel to each other and each comprising the holes for defining the second hinge axis 20.2 and the articulation axis 90. Similarly, the second hinge lever 18.2 comprises two lateral tabs extending parallel to each other and each comprising the holes for defining the third and fourth hinge axes 20.3, 20.4. Finally, the intermediate piece 30 comprises two side walls extending parallel to each other and defining two separate hook-like elements 52 and two separate positioning elements 56. This provides for a symmetrical loading of the furniture hinge 2.

A top surface of the mounting piece 27 comprises a ditch-like depression 106 between the two front holding sections 54, the depression 106 extending parallel to the longitudinal direction 38. The depression 106 serves for receiving the cylinder 24 of the damping element 22 during its pivoting movement about pivot axis 86 during an opening movement and/or a closing movement of the furniture hinge 2. This allows the design of a particular compact furniture hinge 2.

FIGS. 7 to 11 show a second preferred embodiment of the present invention. The main difference in respect to the first embodiment of FIGS. 1 to 6 is that the hinge arm 12 is directly attached to a dome-shaped mounting piece 27' and that there is no intermediate piece 30. Thus, the hinge arm 12 cannot be released from the mounting piece 27' simply by releasing a snap-in connection. Rather, the screws 32 and 40 would have to be loosened in order to separate the hinge arm 12 from the mounting piece 27'.

Consequently, the screws 32 and 40 do not interact with an intermediate piece 30 but directly with the mounting piece 27'. To this end, a threaded hole 36' for receiving the fastening screw 32 and a slot 50' for receiving the adjustment screw 40 are provided on a top surface of the mounting piece 27'. Adjustment of the furniture hinge 2 by means of the screws 32, 40 is similar to what was previously described in respect to the first embodiment.

The cylinder 24 of the damping element 22 is fastened to one of the hinge parts 10, 12 of the furniture hinge 2 (e.g. the hinge arm 12) in a manner pivotable about a pivot axis 86 as described above in respect to the first embodiment. Similarly, a distal end of the piston rod 26 of the damping element 22 is attached to the other component (e.g. the first hinge lever 18.1 or its second lever arm, respectively) pivotably about the articulation axis 90.

The dome-shaped mounting piece 27' forms a hollow space 108 between its top surface and the mounting surface of the furniture body 8, the hollow space 108 extending parallel to the longitudinal direction 38. The hollow space 108 serves for receiving the cylinder 24 of the damping element 22 during its pivot movement about pivot axis 86 during an opening movement and/or a closing movement of the furniture hinge 2. This allows the design of a particular compact furniture hinge 2.

The invention claimed is:

1. A furniture hinge for fastening a furniture door or flap of a piece of furniture to a furniture body of the piece of furniture in an articulated manner, the furniture hinge comprising:

a first hinge part configured to be attached to the furniture door or flap;

a mounting piece configured to be attached to the furniture body;

a second hinge part configured to be attached to the mounting piece;

a hinge assembly connecting the first hinge part to the second hinge part to permit an opening movement of the first hinge part away from the second hinge part and an oppositely directed closing movement; and at least one dampening element configured to dampen the opening movement and/or the closing movement at least towards an end of the movement, the dampening element including a cylinder, a piston linearly movable in the cylinder, and a piston rod coupled to the piston and projecting from the cylinder, the cylinder being pivotably connected about a pivot axis directly or indirectly to one of the first and second hinge parts at least during the opening movement and/or the closing movement;

wherein the at least one dampening element further includes a bearing element arranged on an outer circumferential surface of the cylinder between ends of the cylinder, wherein the cylinder is pivotably connected about the pivot axis to the one of the first and second hinge parts by the bearing element.

2. The furniture hinge of claim 1, wherein:

the other of the first and second hinge parts to which the cylinder is not pivotably connected is connected directly or indirectly to the piston rod at least towards an end of the opening movement and/or the closing movement.

3. The furniture hinge of claim 1, wherein:

the hinge assembly includes at least one hinge lever connected to the first hinge part pivotable about a first hinge axis and connected to the second hinge part pivotable about a second hinge axis, the piston rod being connected to the at least one hinge lever at least towards an end of the opening movement and/or the closing movement, so that the at least one hinge lever actuates the dampening element.

4. The furniture hinge of claim 1, wherein:

the hinge assembly includes at least a first hinge lever and a second hinge lever, the first hinge lever being connected to the first hinge part pivotable about a first hinge axis and connected to the second hinge part pivotable about a second hinge axis, the second hinge lever being connected to the first hinge part pivotable about a third hinge axis and connected to the second hinge part pivotable about a fourth hinge axis, the piston rod being connected to the first hinge lever at least towards an end of the opening movement and/or the closing movement so that the first hinge lever actuates the dampening element.

5. The furniture hinge of claim 1, wherein:

the other of the first and second hinge parts to which the cylinder is not pivotably connected is connected directly or indirectly to the piston rod so that the piston rod is pivotable about an articulation axis relative to the other of the first and second hinge parts.

6. The furniture hinge of claim 1, wherein:

the hinge assembly includes at least a first hinge lever and a second hinge lever, the first hinge lever being connected to the first hinge part pivotable about a first hinge axis and connected to the second hinge part pivotable about a second hinge axis, the second hinge lever being connected to the first hinge part pivotable about a third hinge axis and connected to the second hinge part pivotable about a fourth hinge axis, the piston rod being pivotably directly connected about an articulation axis to the first hinge lever, wherein when the furniture hinge is mounted on the piece of furniture a surface of the furniture body to which the mounting piece is attached defines a first plane, wherein a second plane is defined which extends parallel to the first plane and passes through the second hinge axis, wherein a third plane is defined which extends parallel to the first plane and passes through the fourth hinge axis, and wherein the articulation axis is located between the second plane and the third plane throughout the entire opening movement and/or closing movement of the furniture hinge.

7. The furniture hinge of claim 6, wherein:

a distance between the articulation axis and a straight line connecting the second hinge axis with the fourth hinge axis increases continuously during the entire opening movement of the furniture hinge.

8. The furniture hinge of claim 1, wherein:

the second hinge part is movably connected to the mounting piece and the second hinge part can be fixed to the mounting piece in a selected position relative to the mounting piece, such that by changing the selected position of the second hinge part relative to the mounting piece the furniture door or flap can be adjusted in at least one direction relative to the furniture body.

9. The furniture hinge of claim 1, wherein:

the second hinge part is releasably connected to the mounting piece such that by releasing the second hinge part from the mounting piece the furniture door or flap is released from the furniture body.

10. The furniture hinge of claim 1, further comprising:

at least one spring connected directly or indirectly between the first hinge part and the second hinge part and supporting the opening movement and/or the closing movement at least towards the end of the movement, the at least one spring urging the furniture door or flap into an open position and/or a closed position with respect to the furniture body.

11. The furniture hinge of claim 10, wherein:

the at least one spring is a torsion spring.

12. The furniture hinge of claim 10, wherein:

the at least one spring is supported at a first end directly or indirectly from the first hinge part and the at least one spring is supported at a second end directly or indirectly from the second hinge part.

13. The furniture hinge of claim 1, in combination with the piece of furniture such that the furniture door or flap is fastened to the furniture body in an articulated manner by the furniture hinge.

14. The furniture hinge of claim 1, wherein:

the cylinder of the dampening element is pivotably connected to the one of the first and second hinge parts such that a pivot position of the cylinder with respect to the one of the first and second hinge parts changes during the opening movement and/or the closing movement.

15. A furniture hinge for fastening a furniture door or flap of a piece of furniture to a furniture body of the piece of furniture in an articulated manner, the furniture hinge comprising:

a first hinge part configured to be attached to the furniture door or flap;

a mounting piece configured to be attached to the furniture body;

a second hinge part configured to be attached to the mounting piece;

a hinge assembly connecting the first hinge part to the second hinge part to permit an opening movement of the first hinge part away from the second hinge part and an oppositely directed closing movement; and at least one dampening element configured to dampen the opening movement and/or the closing movement at least towards an end of the movement, the dampening element including a cylinder, a piston linearly movable in the cylinder, and a piston rod coupled to the piston and projecting from the cylinder, the cylinder being pivotably connected about a pivot axis directly or indirectly to one of the first and second hinge parts at least during the opening movement and/or the closing movement;

wherein the hinge assembly includes at least a first hinge lever and a second hinge lever, the first hinge lever being connected to the first hinge part pivotable about a first hinge axis and connected to the second hinge part pivotable about a second hinge axis, the second hinge lever being connected to the first hinge part pivotable about a third hinge axis and connected to the second hinge part pivotable about a fourth hinge axis, the piston rod being pivotably connected about an articulation axis to the first hinge lever, wherein when the furniture hinge is mounted on the piece of furniture a surface of the furniture body to which the mounting piece is attached defines a first plane, wherein a second plane is defined which extends parallel to the first plane and passes through the second hinge axis, wherein a third plane is defined which extends parallel to the first plane and passes through the fourth hinge axis, and wherein the articulation axis is located between the second plane and the third plane throughout the entire opening movement and/or closing movement of the furniture hinge; and wherein a distance between the articulation axis and a straight line connecting the second hinge axis with the fourth hinge axis increases continuously during the entire opening movement of the furniture hinge.

16. A furniture hinge for fastening a furniture door or flap of a piece of furniture to a furniture body of the piece of furniture in an articulated manner, the furniture hinge comprising:

a first hinge part configured to be attached to the furniture door or flap;

a mounting piece configured to be attached to the furniture body;

a second hinge part configured to be attached to the mounting piece;

a hinge assembly connecting the first hinge part to the second hinge part to permit an opening movement of the first hinge part away from the second hinge part and an oppositely directed closing movement; and at least one dampening element configured to dampen the opening movement and/or the closing movement at least towards an end of the movement, the dampening element including a cylinder, a piston linearly movable in the cylinder, and a piston rod coupled to the piston and projecting from the cylinder, the cylinder being pivotably connected about a pivot axis directly or indirectly to one of the first and second hinge parts at least during the opening movement and/or the closing movement;

wherein the at least one dampening element further includes a bearing element arranged on an outer circumferential surface of the cylinder between ends of the cylinder, wherein the cylinder is pivotably connected about the pivot axis to the one of the first and second hinge parts by the bearing element; and wherein the pivot axis of the pivotable connection of the cylinder to the one of the first and second hinge parts extends at a distance greater than zero from a longitudinal axis of the cylinder.

* * * * *